United States Patent [19]
Takeda et al.

[11] Patent Number: 5,350,567
[45] Date of Patent: Sep. 27, 1994

[54] CENTRIFUGAL FLUIDIZING GRANULATOR FOR POWDER COATING GRANULATION

[75] Inventors: Toyohiko Takeda, Kobe; Koji Sato, Kawanishi; Yusuke Suzuki, Izumi; Yoshitaka Tomoda, Daitoh, all of Japan

[73] Assignee: Shionogi & Co., Ltd., Osaka, Japan

[21] Appl. No.: 74,478

[22] Filed: Jun. 11, 1993

[30] Foreign Application Priority Data

Jun. 23, 1992 [JP] Japan .................. 4-190083

[51] Int. Cl.⁵ .................. B05C 11/00; B05D 7/00; G01N 11/02; G05D 7/00
[52] U.S. Cl. .................. 422/111; 73/54.33; 73/54.38; 118/665; 118/DIG. 2; 118/DIG. 5; 137/4; 137/92; 422/145; 427/213
[58] Field of Search .......... 422/110, 111, 139, 145; 73/54.33, 54.34, 54.38; 137/4, 92; 118/665, DIG. 2, DIG. 5; 427/213

[56] References Cited

U.S. PATENT DOCUMENTS

| | | | |
|---|---|---|---|
| 1,960,225 | 5/1934 | Schoenberg | 73/54.34 |
| 3,831,616 | 8/1974 | Weyers | 137/92 |
| 4,363,742 | 12/1982 | Stone | 422/111 |
| 4,494,971 | 1/1985 | Monteyne et al. | 65/19 |
| 4,542,043 | 9/1985 | Abe et al. | 118/DIG. 5 |
| 4,834,299 | 5/1989 | Kishibata et al. | 241/5 |
| 4,902,210 | 2/1990 | Shibata | 425/6 |
| 4,960,547 | 10/1990 | Reinhard | 264/11 |
| 4,994,458 | 2/1991 | Kilbride, Jr. | 514/251 |
| 5,110,523 | 5/1992 | Guggiari | 264/40.5 |

FOREIGN PATENT DOCUMENTS

| | | |
|---|---|---|
| 111807 | 6/1984 | European Pat. Off. . |
| 59-120235 | 7/1984 | Japan . |
| 61-178031 | 8/1986 | Japan . |
| 2233132 | 9/1990 | Japan . |
| 324420 | 2/1991 | Japan . |
| 4151519 | 5/1992 | Japan . |
| 4225141 | 8/1992 | Japan . |

*Primary Examiner*—Robert J. Warden
*Assistant Examiner*—L. M. Crawford
*Attorney, Agent, or Firm*—Cushman, Darby & Cushman

[57] ABSTRACT

The centrifugal fluidizing granulator for powder coating granulation has a sensor for detecting changes of viscosity of the growing particles by means of a load cell or a displacement detector; and output signal of the sensor is compared with the data stored in a memory contained in a control unit which determines whether the growing particles are in their wetted state or dried state. The control unit controls the spraying of the liquid and the dispersion of the guest powder based on the result of the comparison.

16 Claims, 7 Drawing Sheets

CENTRIFUGAL FLUIDIZING GRANULATOR FOR POWDER COATING GRANULATION

FIELD OF THE INVENTION AND RELATED ART STATEMENT

1. Field of the Invention

The present invention relates to a centrifugal fluidizing granulator for powder coating granulation for manufacturing a granular type pharmaceutical product and the like with powder coating of a guest powder.

2. Description of the Prior Art

In general, the centrifugal fluidizing granulator for powder coating granulation has been known as a means for producing granules with coating of guest powder such as a powdery pharmaceutical product. The conventional centrifugal fluidizing granulator for powder coating granulation is such that, a multiplicity of the particles become the cores in the produced granules (throughout this description and claims, to be referred to as "core particles") and are caused to spirally roll at a peripheral portion on the rotating disk, which is disposed in the granulating chamber of cylindrical shape. In addition, a liquid is atomized or sprayed on the rolling core particles for making the core particles moist. Guest powder is dispersed on the rolling granules, so that it adheres to the surface of the damp core particles. The spraying of the liquid and the dispersal of the guest powder is repeated alternately, or performed simultaneously, thereby causing the core particles to be dusted with and densely coated with the pharmaceutical guest powder and gradually grow into granules having an intended size.

In the known centrifugal fluidizing granulator and the method for powder coating granulation, when the amount of the liquid to be atomized or sprayed is excessive, coated core particles or the produced granules may sometimes adhere to the other particles or produced granules, thereby producing an undesirably large granules. In contrast to this, when the amount of the supplied guest powder is excessive, the guest powder may sometimes solidify by itself after the sprayed liquid is provided and produce particles having no core particles. Therefore particle sizes often grow unequal, and such irregular particles are undesirably mixed in the granules of regular size.

In order to prevent the above-mentioned disadvantages, the amount of the liquid to be atomized or sprayed and the amount of the guest powder must be accurately controlled. In addition, since the surface area of the particles increase with the growth of the granules during the process of the granulating operation, the amount of the liquid to be atomized or sprayed and the amount of the guest powder for the dispersal must be controlled in relation to the progress of the granulation and the growth of the granules.

However, it has hitherto been difficult to directly measure the particle diameter or size of the growing granules during the granulating operation. In addition, the adjustment of the amount of the liquid to be atomized or sprayed and the amount of the guest powder for the dispersal has hitherto been based mainly on the intuition of the skilled operator. Therefore, the prior art is problematic in that it is difficult to always obtain particles of uniform size, and that the irregularity in the products is great for the respective product lots.

SUMMARY AND OBJECT OF THE INVENTION

The present invention has been made in order to solve the above-stated problems, and, has as its object, the provision of a centrifugal fluidizing granulator for powder coating granulation, as well as, a granulation method, wherein the conditions of the growing granules is detected precisely under the granulating operation, and the atomization/spraying of the liquid and the dispersal of the powdery pharmaceutical is automatically controlled.

According to the present invention, there is provided a centrifugal fluidizing granulator comprising:

a stationary granulating chamber of a generally cylindrical shape with a top plate above which there is provided at least a powder supplying means, a liquid supplying means and through which an outlet for escaping gas is provided, and with a bottom plate having a bearing for a vertical shaft;

a rotor of a generally disk shape disposed in and near the bottom portion of the granulating chamber and which is rotatable around the vertical shaft, for carrying particulate material to be granulated thereon and upon its rotation, produces a spiral flow of the particulate material and granules produced;

a sensor is cooperable the granulating chamber for detecting a surface condition of the particulate material and has its lower end capable of coming into contact with each of particles and granules so as to be subjected to stress by the flow of particulate material and output an electric signal in response to the stress; and a control means for controlling the powder supplying means and the liquid supplying means in a manner that, when the output signal of the sensor is no larger than a first predetermined value, it stops the dispersal of the guest powder and starts the spraying of the liquid for wetting the particles, and when the output signal of the sensor is larger than a second predetermined value, it stops spraying the liquid and starts to disperse the guest power for coating the wet particles with the guest powder.

In the above-mentioned centrifugal fluidizing granulator, the lower end of said sensor may be shaped as a thin plate whose vertical sides are finished as knife edges, disposed in parallel with the direction of said rolling flow of particulate material and granules, while the upper end of said sensor is provided with a load detecting device.

In the above mentioned centrifugal fluidizing granulator, the sensor may also be provided with a balancing weight to enhance its own dynamical stability, with the lower end of said sensor being shaped to be a cylinder which displaces with said spiral flow of particulate material and granules, and the upper end of said sensor is provided with a displacement detecting device.

In another aspect of the present invention, there is provided a method for powder coating granulation comprising: a first step of continuously providing a liquid to core particles contained in a granulating chamber and producing a spiral flow of the particles on a continuously rotating rotor in the granulating chamber; a second step of stopping the spraying of the liquid and starting a dispersal of guest powder for coating on the core particles, when an output signal produced by a sensor provided in the granulating chamber and subject to the stress from the spiral flow of the core particles and representing the stress, indicates an initial predetermined value; a third step of stopping the dispersion of the guest powder and starting the spraying of the liquid, when the output signal, which is produced by the sensor subjected to the stress from the spiral flow of core particles whose surfaces are coated with the dispersed guest powder and representing the stress, indicates a first predetermined value as contrasted to the initial predetermined value; a fourth step of stopping the provision of liquid and resuming the dispersion of the guest powder, when the output signal, which is produced by the sensor subjected to the stress from the spiral flow of core particles whose surfaces are further coated with the guest powder and representing the stress, indicates a second predetermined value which is greater than the first predetermined value; and a fifth step of repeating the third and fourth steps alternately until the guest powder is dispersed up to a predetermined amount.

In a further aspect of the present invention, there is provided a method for powder coating granulation comprising: a first step of continuously providing a liquid to core particles contained in a granulating chamber and producing a spiral flow of the particles on a continuously rotating rotor in the granulating chamber; a second step of starting a dispersion of guest powder concurrently with the provision of the liquid, when, an output signal, which is produced by a sensor provided in the granulating chamber and subjected to the stress from the spiral flow of the core particles and representing the stress, indicates an initial predetermined value; a third step of increasing the amount of the guest powder to be dispersed or decreasing the amount of the liquid to be provided, when the output signal, which is produced by the sensor subjected to a stress by the spiral flow of the core particles whose surfaces are coated with the guest powder and representing the stress, changes from the initial predetermined value and the degree of the change exceeds a predetermined range; a fourth step of increasing the amount of the liquid to be provided or decreasing the amount of the guest powder to be dispersed, when the output signal, being produced by the sensor subjected to a stress from the spiral flow of the core particles whose surfaces are further coated with the guest powder and representing the stress changes from the initial predetermined value and the degree of the change, runs below the predetermined range; and a fifth step of repeating the third step or the fourth step selectively until the guest powder is dispersed up to a predetermined amount.

The particles of granular shape have different properties depending on whether the surface condition of the particles is in the wet state or in the dry state. The particles in the wet state demonstrate an intermediate state between a liquid and a solid (for instance, a slurry or mud state). More concretely, the viscosity of the flow of the particles whose surfaces are in the wet state is larger than that of the flow of the particles whose surfaces are in the dry state. In accordance with the present invention, the above-mentioned sensor detects the change in the viscosity and transmits the corresponding output signal to the above-mentioned control unit. The control unit determines whether the surfaces of the particles contained in the granulating chamber are in a given degree of wet state or in that of dry state by comparing the output signal with the stored data, and controls the spraying or atomizing of the liquid as well as the dispersion of the guest powder based on the result of the determination.

As above-mentioned, the centrifugal fluidizing granulator and the method for powder coating granulation in accordance with the present invention has such an advantage that the amounts of the guest powder (pharmaceutical product) and of the liquid are neither excessive nor insufficient. This is because the adjustment on the amounts can be made automatically by the control unit based on the output signal from the sensor. Therefore, there is no undesirable adhesion of one particle to the other to produce larger particles, nor are there particles having no core particle and unequal particle size which may be produced from an excess of guest powder through solidifying by itself with the atomized liquid.

In addition to this, since there is no longer a need to rely upon the intuition of the operator in charge, there is another advantage in that anyone can operate the granulator or carry out the method to manufacture a uniform product. Furthermore, deviation from the established standard among the product lots becomes very small.

While the novel features of the present invention are set fourth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

In the following paragraphs, the preferred embodiments of the present invention will be described with reference to the attached drawings.

Figure 1:
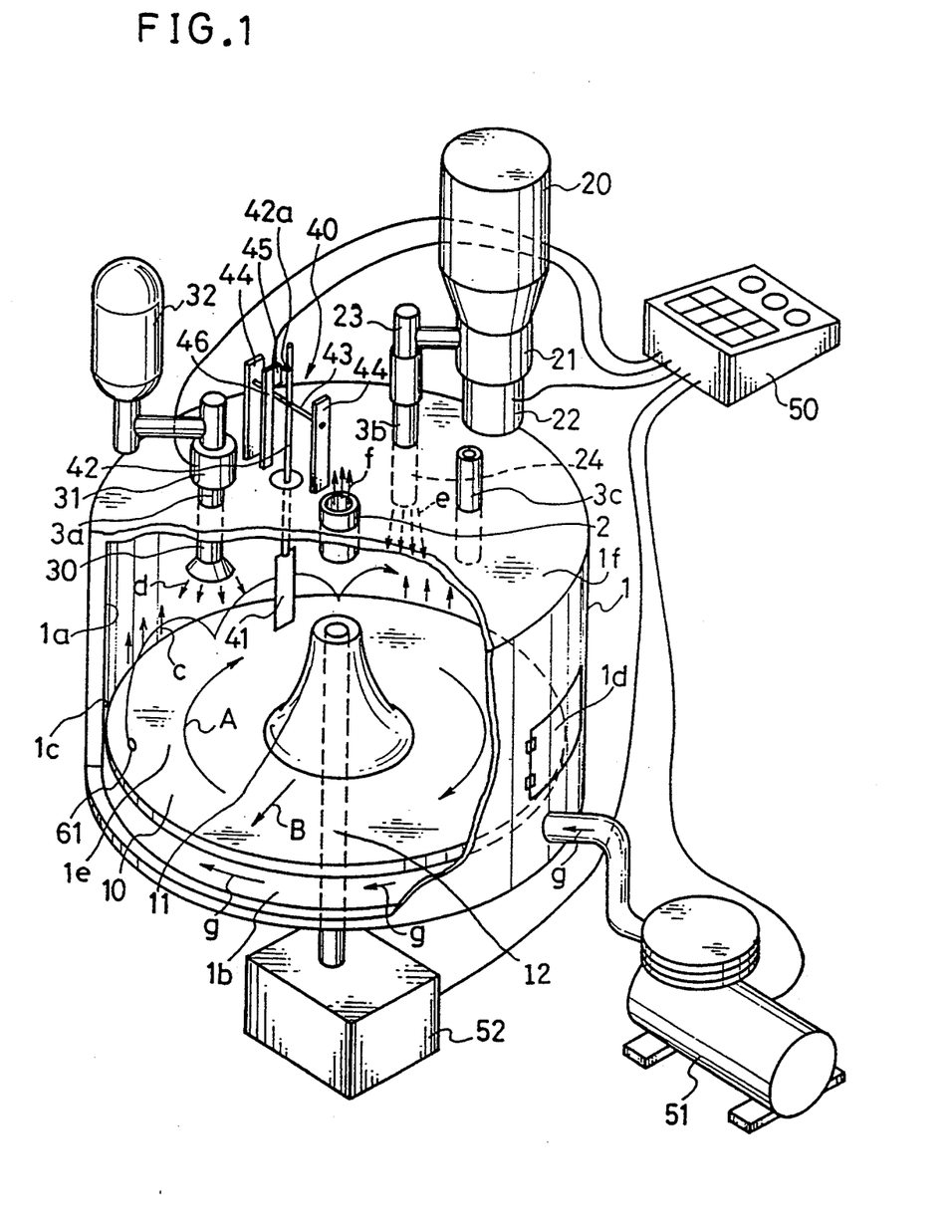
FIG. 1 is a partly cut-out perspective view of the centrifugal fluidizing granulator configured in accordance with the present invention.
Figure 2:
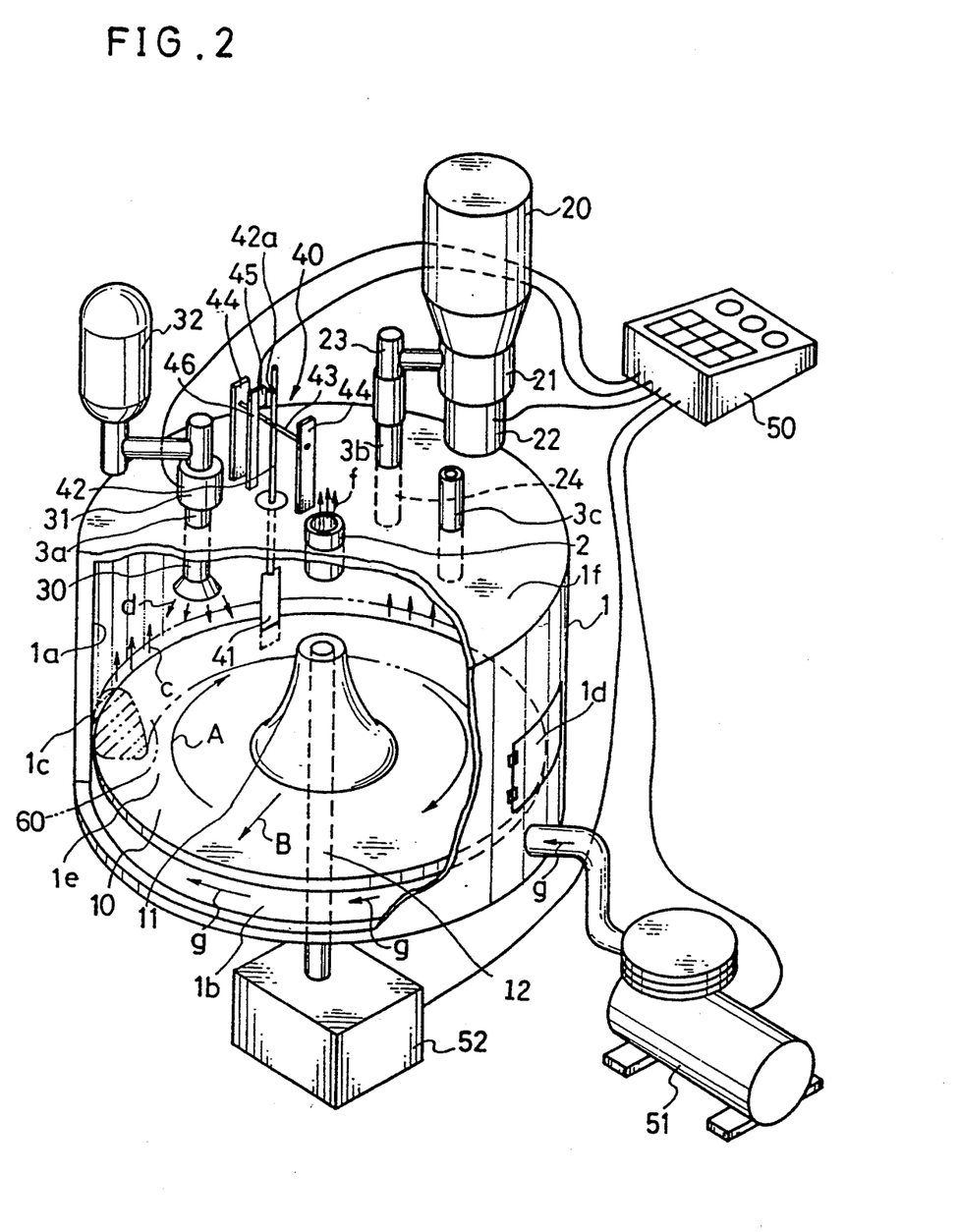
FIG. 2 is a partly cut-out perspective view of the centrifugal fluidizing granulator as shown in FIG. 1, illustrating a state of spraying liquid.
Figure 3:
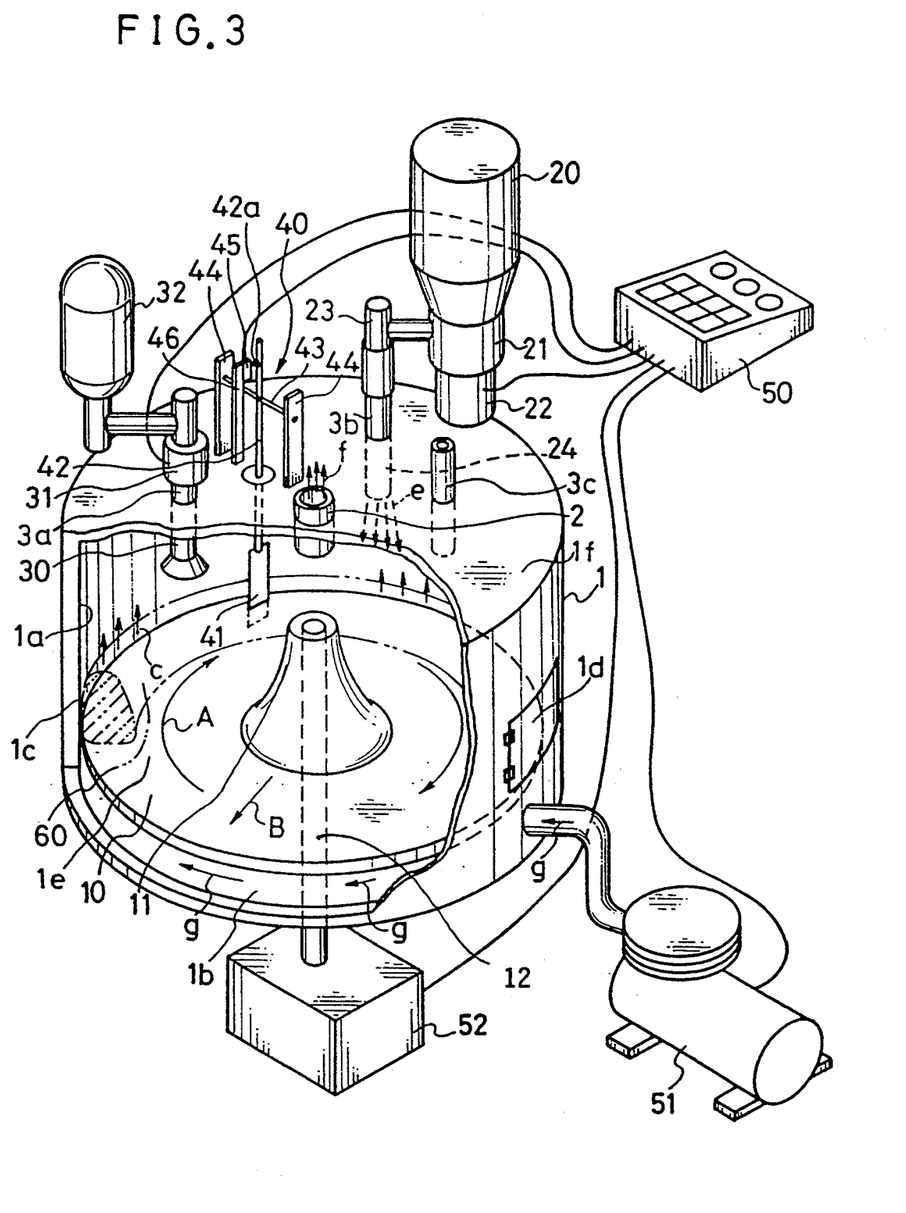
FIG. 3 is a partly cut-out perspective view of the centrifugal fluidizing granulator as shown in FIG. 1, illustrating a state of dispersing guest powder.
Figure 4:
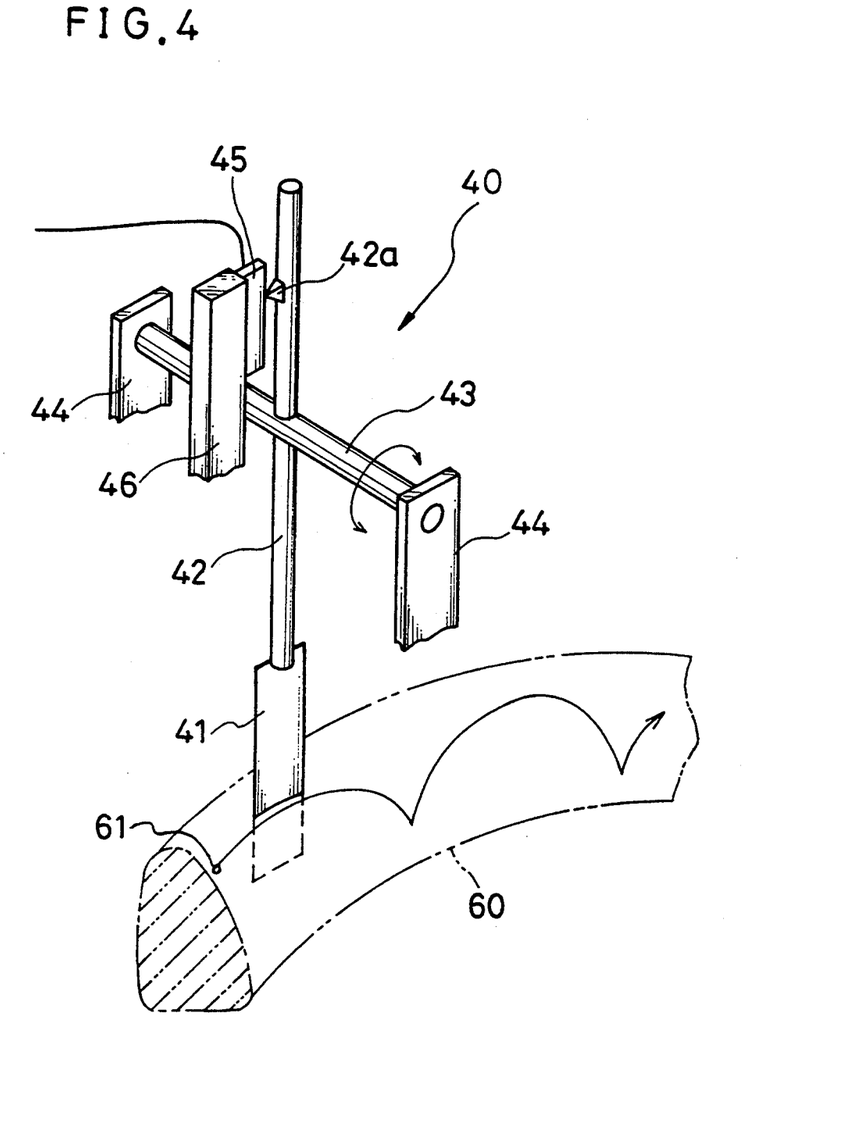
FIG. 4 is a partly cut-out perspective view for illustrating a sensor built in accordance with a first embodiment of the present invention.
Figure 5:
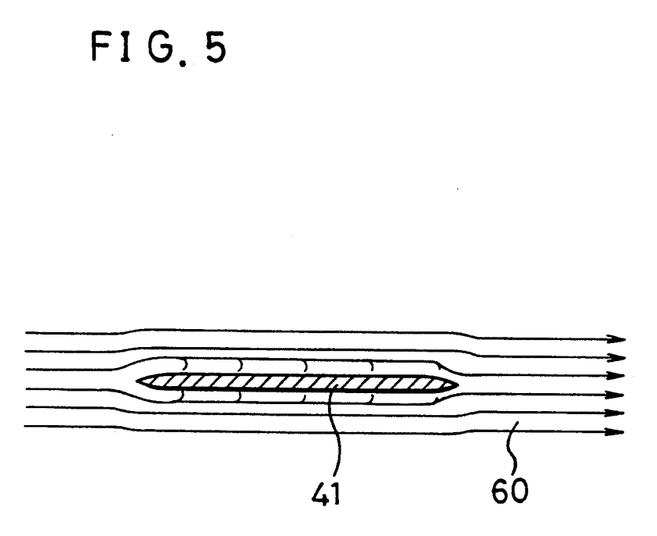
FIG. 5 is a partly cut-out plan view for illustrating the relationship between the sensor shown in FIG. 4 and the flow of the spirally moving particles.

FIG. 1 is a schematic perspective view of the centrifugal fluidizing granulator built in accordance with the present invention. FIGS. 2 and 3 are partly cut-out perspective views like FIG. 1 for illustrating a state of spraying liquid, and a state of dispersing guest powder, respectively. FIG. 4 is a partly cut-out perspective view for illustrating a sensor built in accordance with the first embodiment of the present invention, and FIG. 5 is a partly cut-out plan view for illustrating the relationship between the sensor shown in FIG. 4 and the flow of the spirally moving particles.

As shown in FIG. 1, a rotor 10 of generally a disk shape is accommodated rotatably in a granulating chamber 1 of a cylindrical shape. The rotor 10 is rotated in a given direction (in the shown granulator, in the clockwise direction) at a given rotational frequency by a motor 52. The interior space of the granulating chamber is partitioned by the rotor into a pair of spaces, i.e., an upper compartment 1e and a lower compartment 1b. The lower compartment 1b is constantly supplied with air of a predetermined pressure, a predetermined temperature and a predetermined humidity at a predetermined rate by a compressor 51 as shown by an arrow g. The air supplied in the lower compartment 1b is then blown into the upper compartment 1e, through a clearance 1c formed between the inner side wall 1a of the granulating chamber 1 and the periphery of the rotor 10. It is to be noted here that the particulate material present on the rotor 10 should not fall into the lower compartment 1b. In order to prevent the particulate material from falling into the lower compartment 1b and to make the air stream uniform, the clearance 1c formed between the inner side wall 1a of the granulating drum 1 and the periphery of the rotor 10 must be finished very small and uniform. A long hub 11 of the rotor 10 for securing its shaft 12 is effective for suppressing the inclination of the shaft of the rotor 10 to very small degree and for designing the clearance 1c to be also very small.

On upper plate 1f of the granulating chamber there is provided a vent 2 for escaping air as well as a plurality of through pipes 3a, 3b, 3c and so on. The air supplied to the granulating chamber 1 is expelled therefrom, and flows to outer space through the vent 2 as shown by an arrow f. On one through pipe 3a, there is provided a spray gun 30 for spraying liquid at the lower end thereof, a valve 31 for controlling the spraying of the liquid at the middle part thereof and a container 32 for storing the liquid at the upper end thereof. On the other through pipe 3b, there is provided a nozzle 24 for dispersing the guest powder (pharmaceutical product) and a connecting pipe 23. To the connecting pip 23 an impeller 21 is connected for controlling the supply of the guest powder, and a motor 22 for driving the impeller 21 and a powder supplying unit 20 for storing the guest powder are connected to the impeller 21. On the side wall of the granulating chamber 1, there is provided an opening with a door 1d for removing the granules produced in the chamber 1 therethrough.

A sensor 40 is provided on the ceiling if of the granulating chamber 1 in a manner to be suspended therefrom in the upper compartment 1e of the granulating drum 1. As specifically shown by the enlarged perspective view of FIG. 4, the sensor 40 comprises; a vertical rod 42 which pierces through the ceiling 1f of the granulating drum 1, a thin plate or incident member 41 provided on the lower end part of the vertical rod 42, a lateral rod 43, a pair of bearing members 44 for pivotally supporting the lateral rod 43, a protrusion 42a provided on the upper end part of the vertical rod 42, a load cell 45 as a load detecting device for detecting the load received by the protrusion 42a, and a supporting pillar 46 for the load cell 45. The thin plate or incident member 41 receives stress or impact from the rolling particles. The thin plate 41 is typically a metal plate of about 3 cm width and 1-1.5 mm thickness, vertical sides of the metal plate having knife-like sharp edges. The compressor 51, the motors 22 and 52, the valve 31 as well as the load cell 45 are connected to a control unit 50.

In the following paragraphs, a description will be made on the moving behavior of the particles under the granulating operation.

When the moving particles are seen macroscopically, that is, the mass of particles seen collectively as a whole, the particles under the granulating operation are observed as a doughnut-like zone 60 formed with a multiplicity of the spirally or annularly moving particles, as shown by FIGS. 2, 3 and 4. In contrast to this, when viewed microscopically, the individual particle under the granulating operation 61 receives a combination of (1) a rotational force indicated by an arrow A exerted by the rotation of the rotor 10, (2) a centrifugal force indicated by an arrow B, (3) a reaction force produced upon the collision of the particle on the inner side wall 1a, (4) an upward force given by the flow of air indicated by an arrow C, (5) a downward force generated by gravity and (6) a reaction force by the rotation of the rotor 10. It is considered that the individual particle 61 is performing a spiral (i.e., not a true spiral, but rather rolling while bouncing) motion in the doughnut-like three-dimensional zone as a result of complicated combination of these forces.

Referring now to FIGS. 4 and 5, the position of the plane surface of the thin plate 41 in relation to the sensor 40 will be discussed. If the thin plate 41 were arranged in a manner such that it would intersect with the direction of the motion of the particles 61 at right angle, the particle 61 would collide vertically upon the plane of the thin plate 41 and the stress received by the collision would be detected. The stress due to the collision is dominated mainly by the mass of the particles, and thus it is substantially impossible to detect the variance in the stress due to changes in the surface conditions of the particles. In other words, in case of the intersectingly disposed plate, the variance in the stress determined by the surface conditions such as being wet or being dry of the particle of a given mass is only slight in comparison with the variance resulting by variance of mass of the particle, which may be introduced by the spray of the liquid or the dispersion of the guest powder.

On the other hand, the inventor has confirmed that, when the thin plate 41 is arranged in parallel with the direction of the movement of the particles and both the vertical side edges of the thin plate 41 are finished as knife-like sharp edges 70 as specifically indicated by FIGS. 4 and 5, the particle 61 only seldom collides directly with the thin plate 41. In this case, the surface of the thin plate receives only the frictional force produced upon spiral movement of the particle 61 in the doughnut shaped region 60. The frictional force demonstrates a remarkable difference in its degree depending on the surface conditions of the particle whether it is wet or dry. Therefore, the frictional force is preferable for indicating the variance of the surface conditions of the particle. Thus, it is possible to reliably detect the variance of the surface conditions of the particle distinctly by utilizing this frictional force. For the above-described reason, as shown in FIGS. 1-4, the thin plate 41 is fixed on the sensor 40 in a manner that its face is generally parallel with the direction of the spiral motion of the individual particle 61.

In the following paragraphs, a first method for powder coating granulation in accordance with the present invention will be described with reference to FIGS. 2 and 3.

As a first step, a given amount of the core particles are provided into the granulating chamber 1. The core particles are those having a mean diameter of 200–500 μm of an inert material having no pharmaceutically active ingredient and typically composed mainly of starch, sugars, celluloses and the like. The rotor 10 is continuously rotated in a given direction at a given rotational frequency. The compressor 51 is constantly supplying the dry air to the lower compartment 1b of the granulating drum 1 at a given temperature and at a given rate. In this manner, the core particles 61 (FIG. 4) are rolling while spirally or annularly moving on the rotor 10 inside the granulating chamber 1. The mass of the core particles 61 as a whole is observed as if it is forming a doughnut-like mass 60 wherein many particles are making a spiral or generally annular motion.

In a first step, the control unit 50 actuates the valve 31, so as to permit the spray gun 30 to continuously spray the liquid stored in the container 32 to the rolling and bouncing core particles in the granulating drum 1, until the core particles reach a wetted state of certain degree. The liquid used in the first step is typically one that includes a binding agent such as methyl cellulose and ethyl cellulose. During this spraying operation, the rolling and bouncing core particles, which had initially been in a dried state, are gradually wetted and their surface viscosity is increased. Thus the frictional force imposed on the surface of the thin plate 41 of the sensor 40 by the core particles is gradually increased, and the output signal of the load cell 45 becomes greater as a result.

An output signal of the load cell 45 produced when the core particles are in a given degree of wetted state has previously been measured in a preliminary separate experiment and stored in a memory contained in the control unit 50, as an initial predetermined (or a threshold) value. The control device 50 compares the actual output signal from the load cell 45 with the stored initial predetermined value.

As "a second step", after operation of the device for a certain period and, when the output signal from the load cell 45 reaches to the initial predetermined value, the control unit 50 stops the spraying of the liquid by actuating the valve 31, and starts the dispersing of the guest powder (pharmaceutical product) stored in the powder supplying unit 20 to the interior space of the granulating chamber 1 by actuating the motor 22. When the surfaces of the core particles in the wetted state start to be dusted with the guest powder, the conditions of the surfaces gradually turn from their wetted state to their dried state. During this dusting process, the surfaces of the dusted particles gradually become dried. As the amount of the guest powder attached to the surface of the core particles increases, the output signal of the load cell 45 becomes gradually smaller. The dusted particles, whose surfaces are uniformly coated with the guest powder, have surfaces in a substantially dried state of a smaller viscosity as compared with the uncoated particles, whose surfaces are in a wetted state.

An output signal of the load cell 45 produced when the particles are in this substantially dried state has previously been measured in another separate experiment and its value has been stored in a memory contained in the control unit 50, as the first predetermined (or the threshold) value. The control unit 50 compares the actual output signal from the load cell 45 with the stored first predetermined value.

Then, as "a third step", when the output signal from the load cell 45 reaches the above-mentioned first predetermined value, the control unit 50 stops the dispersing of the guest powder as a result of de-actuating of the motor 22 and starts the spraying of the liquid again by actuating the valve 31. With the progress of the spraying of the liquid, the guest powder coated on the particles is getting wet, and the particles turns from the dried state to another wetted state, thereby gradually increasing the output signal of the load cell 45.

In general, the viscosity of the surfaces of the core particles in the wetted state is not always coincident with the viscosity of the surfaces of the particles dusted with the guest powder in the same wetted state. It is therefore necessary for properly performing the granulating operation by previously measuring in another experiment an output signal of the load cell 45 produced under such case that the particles dusted with the guest powder are in a wetted state, and then storing the measured value in a memory contained in the control unit 50 as a second predetermined (threshold) value. So that the control unit 50 compares the actual output signal from the load cell 45 with the stored second predetermined value.

Then, as "a fourth step", when the output signal from the load cell 45 reaches the second predetermined value, the control unit 50 stops the spraying of the liquid by actuating the valve 31 and starts the dispersion of the guest powder stored in the powder supplying unit 20 to the interior of the granulating chamber 1 again by actuating the motor 22.

Thereafter, as "a fifth step", the above-mentioned third step and fourth step are alternately repeated until the particles are grown to acquire a desired diameter, or until the dispersion of the guest powder of a given amount is completed.

In the following paragraphs, a second method for powder coating granulation in accordance with the present invention is elucidated. In this second embodiment, the spraying of the liquid and the concurrent dispersion of the guest powder are performed simultaneously. In this second method, parts of the description, which are the same as those in the foregoing first method example wherein the spraying of the liquid and dispersion of the powdery pharmaceutical are repeated alternately, will be omitted for brevity.

Here, as "a second step", when the output signal from the load cell 45 reaches the initial predetermined value in a first step which value is identical with that of the first method, the control unit 50 starts the dispersal of the guest powder stored in the powder supplying unit 20 to the interior of the granulating chamber 1 by actuating of the motor 22, while the spraying of the liquid is continued.

With the progress of the coating of the surfaces of the core particles spirally rolling in the granulating chamber with the guest powder, the sizes of the coated particles gradually grow greater and their surface areas also increase. Along with this phenomenon, the difference of the particle diameters between those of the coated particles and those of the guest powder becomes great; and thus the amount of the liquid required for wetting the surface of the particles varies accordingly.

When the amount of the spraying liquid and the amount of the dispersed guest powder are kept constant, the surfaces of the particles gradually turns to either of their excessively dried state or excessively wetted state. In order to prevent such excessive states, preferably the measuring is made on the variance in the output signal produced by the load cell 45 at the time of performing the granulating operation in an optimum condition in a separate previous experiment, and the measured data of this variance is stored in a memory contained in the control unit 50. The control unit 50 compares the actual variance in the output signal from the load cell 45 with the stored data.

As "a third step" of this second method, when the variance in the output signal from the load cell 45 runs above a given range defined on the basis of the stored data with the progress of the granulating operation, it is determined that the surfaces of the particles turn to the wetted state as compared with the optimum condition in the granulating operation. When determined so, the control unit 50 decreases the amount of the spraying liquid by actuating the valve 31 or increases the amount of the guest powder for the dispersal by controlling the motor 22. In this manner, the surface conditions of the particles in the granulating chamber 1 turns from their wetted state to the optimum state.

In contrast to this, as "a fourth step" of this second method, when the variance in the output signal from the load cell 45 runs below the given range defined on the basis of the stored data with the progress of the granulating operation, it is determined that the surfaces of the particles turn to the dried state as compared with the optimum condition in the granulating operation. When determined so, the control unit 50 increases the amount of the spraying liquid by actuating the valve 31 or decreases the amount of the guest powder for the dispersal by controlling the motor 22. In this manner, the surface conditions of the particles in the granulating drum 1 are turned from their dried state to the optimum state.

As "a fifth step", the above-stated third and/or fourth steps are selectively repeated until the particles are grown to have a desired particle size, or until the dispersion of the guest powder of a given amount is completed. In this second method of powder coating granulation, however, the third step and the fourth step are not always repeated alternately, in contrast to the first method, because both the spraying of the liquid and the dispersal of the guest pharmaceutical powder are being performed substantially concurrently during the process.

As previously described, it is required to gradually adjust the amount of the guest powder to be dispersed and the amount of the liquid to be sprayed with the growing of particle size and the increasing of surface area of the particles, during the process in the above-mentioned centrifugal fluidizing granulator in the method for powder coating granulation. In the past, the adjustments of the amounts of the guest powder and the spraying liquid have been relied upon the intuition of the operator in charge. But, according to the present invention, the adjustment can be made automatically by the control unit 50 based on the output signal from the sensor 40, and hence the amounts of the guest powder (pharmaceutical product) and of the liquid are adjusted to a suitable one. Therefore, there is no occurrence, such as, of undesirable adhesion of one particle to the other to produce a larger particles, of an undesirable inclusion of the particles lacking core particle, and of unequal particle size which may be produced from the excessive guest powder by solidifying by itself with the atomized liquid.

In the following paragraphs, a second embodiment of the sensor unit of the centrifugal fluidizing granulator built in accordance with the present invention will specifically be described with reference to FIGS. 6 and 7. In this description, the configuration of the centrifugal fluidizing granulator other than the sensor unit is the same as those of the first embodiment shown in FIG. 1, and hence the illustration therefor will be omitted for brevity.

Figure 6:
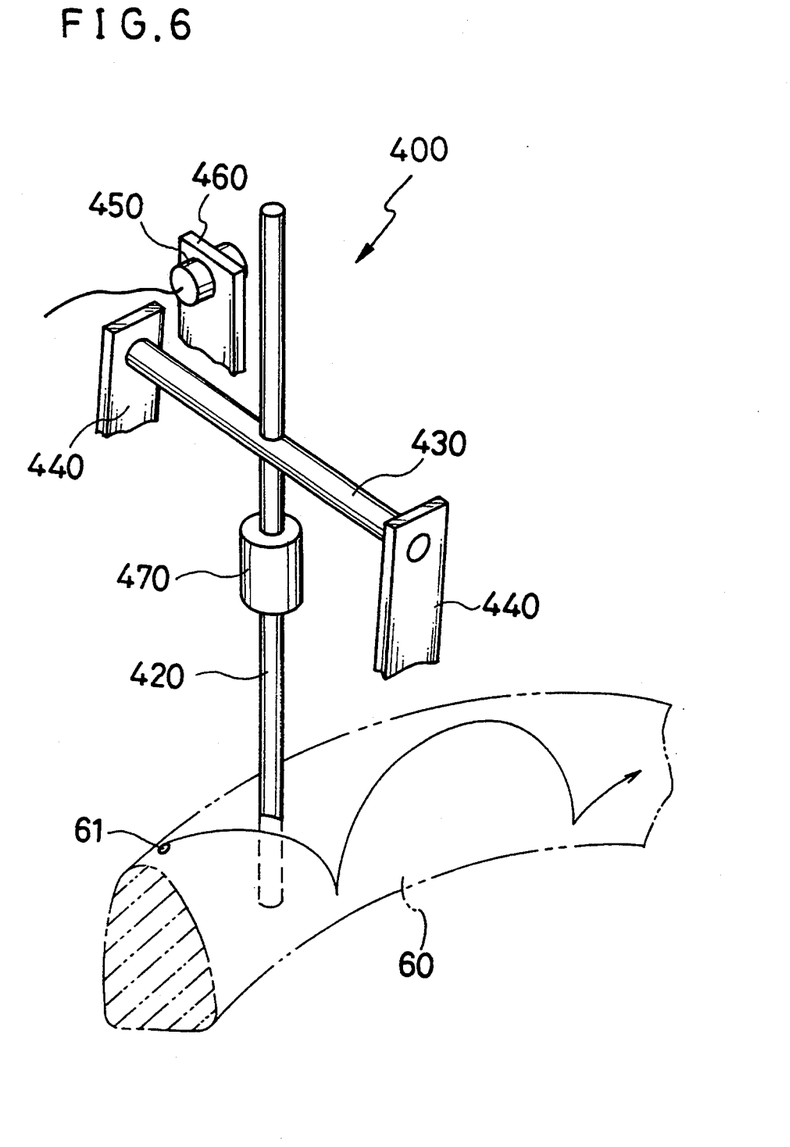
FIG. 6 is a partly cut-out perspective view for illustrating a sensor built in accordance with a second embodiment of the present invention.

In FIG. 6, the sensor unit 400 comprises; a vertical rod 420 which operates as an incident member as in the first embodiment, a lateral rod 430 fixed to the vertical rod 420, a pair of bearing members 440 provided on the top plate or roof 1f of the granulating chamber 1 for rotatingly holding the lateral rod 430, a balancing weight 470 fixed on the vertical rod 420 and located below the lateral rod 430, a displacement detecting device 450 arranged in close to the upper end of the vertical rod 420 for detecting the displacement of the vertical rod 420. A supporting pillar 460 provided on the roof 1f and supports the displacement detecting device 450. The vertical rod 420 is typically a rod and the cross-section of at least its lower end part is circular. The displacement detecting device 450 is typically a differential transformer which converts the mechanical displacement into an electrical signal and outputs the electric signal. The balancing weight 470 is provided for giving a dynamical stability on the vertical rod 420, as in a pendulum.

Figure 7:
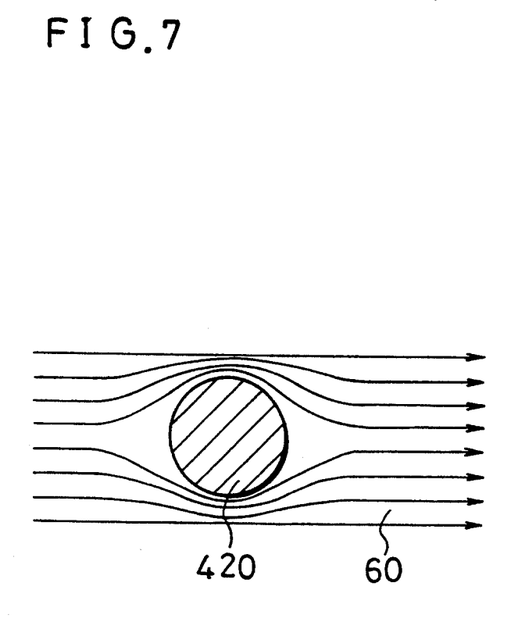
FIG. 7 is a schematic sectional plan view illustrating the relationship between the sensor shown in FIG. 6 and the flow of the spirally moving particles.

When the lower end part of the vertical rod 420 is immersed in the zone 60 of the spirally moving particles 61 as shown by FIG. 6, some of the particles are rolling along the surface of the vertical rod 420 as shown by FIG. 7. At that time, the vertical rod 4200 is impacted by the particles and receives a stress from the particles in the direction of moving particles by friction between the vertical rod 420 and the particles, and pivotally moves around the axis of the lateral rod 430. On the other hand, gravity is constantly acting on the balancing weight, and therefore the vertical rod 420 stands still at an inclined position where the frictional force received from the moving particles is balanced with the gravity. The larger the viscosity of the moving particles is, the larger the frictional force received by the vertical rod 420 is and also the larger the angle of the inclination is. The resultant angle of the inclination of the vertical rod 420 is detected by the displacement detecting device 450.

Incidentally, the output signals from the load cell 45 shown in FIGS. 1-4 and that from the displacement detecting device 450 shown in FIG. 6 are actually a combination of a multiplicity of components, e.g., a monotonously increasing component and a periodically fluctuating factor which repeatedly increases or decreases depending on the change in the surface conditions of the particles. With the progress of the granulating operation the particle diameter of the growing particles increases, and its contacting area with the thin plate or incident member 41 of the sensor unit 40 or with the vertical rod 420 of the sensor unit 400 increases accordingly. With the increase in the contacting area, the frictional force of the particles acting on the sensor unit 40 or 400, as a whole, demonstrates a monotonously increasing tendency. This results in a monotonously increasing component. On the contrary, the periodically fluctuating factor is resulted from the output signal of the sensor unit 40 or 400 which increases or decreases depending on the surface conditions of the particles which repeatedly alternate from the wetted state to the dried state and vice versa, and to the output signal of the sensor 40 or 400 which increases or decrease by the consecutive of an agglomerate formed with a plurality of particles by their viscous properties in their wetted state.

In each of the foregoing embodiments, although the descriptions are limited to the cases wherein the guest powder (pharmaceutical product) of a single ingredient are finished to the granules, the embodiments are also applicable to the cases wherein the guest powders of a plural kinds of the active ingredients are granulated in a laminated state. For the latter case, it is advantageous to connect a plurality of powder supplying units 20 containing respectively different kinds of guest powders of active ingredients to the plurality of through pipes 3a, 3b, 3c, and so on, and to perform the dispersals of the guest powders in turn in response to the coating of the respective layers.

Although the present invention has been described in terms of the presently preferred embodiments, it is to be understood that such disclosures is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A centrifugal fluidizing granulator comprising:
   a stationary granulating chamber of a generally cylindrical shape and having an upper and lower plate, said lower plate being supported by a vertical shaft, and said upper plate carrying a powder supply means for providing a guest power to said chamber and a liquid supplying means for providing a liquid to said chamber;
   a generally disk-shaped rotor disposed near the lower plate of said granulating chamber and rotatable about said vertical shaft for carrying particulate material to be granulated and for producing a predetermined macroscopic flow of said particulate material to form granules upon rotation thereof;
   a sensor supported by said granulating chamber and having a lower portion thereof disposed at a predetermined position within said macroscopic flow of said particulate material and said granules, said sensor being movable in a vertical plane parallel to said macroscopic flow of particulate material and granules at said predetermined position, said lower portion being subjected to impact of said macroscopic flow of particulate material and granules and enabling said sensor to output an electric signal in response to said impact; and
   control means for controlling said powder supplying means and said liquid supplying means such that, when the output signal of said sensor is less than a first predetermined value, it terminates a dispersal of said guest powder to said chamber and enables said liquid supplying means to provide said liquid to said chamber for wetting said particles, and when the output signal of said sensor is greater than a second predetermined value, it terminates a spraying of the liquid and enables said powder supplying means to provide the guides powder for coating the wet particles with the guest powder.

2. The centrifugal fluidizing granulator according to claim 1,
   wherein said lower portion of said sensor is shaped as a thin plate having vertical sides defined by sharp peripheral edges, said vertical sides being disposed parallel to the predetermined macroscopic flow of particulate material and granules at said predetermined position.

3. The centrifugal fluidizing granulator according to claim 1,
   wherein said sensor is provided with a weight member to give it a restoring force, and the lower portion of said sensor is shaped as a cylindrical rod which is displaced as a result of said impact from said macroscopic flow of particulate material and granules, said sensor being provided with a displacement detector which generates an electric signal corresponding to said displacement of said rod.

4. A method for powder coating granulating, comprising the steps of:
   i) spraying a liquid onto core particles contained in a granulating chamber and producing a predetermined flow of said particles on a continuously rotating rotor in the granulating chamber;
   a ii) terminating the spraying of the liquid and commencing a dispersing of guest powder for coating the core particles with said guest powder when an output signal generated by a sensor provided in said granulating chamber indicates that said sensor is being subjected to a stress, having a first predetermined value, produced by said predetermined flow;
   iii) terminating the dispersion of the guest powder and commencing the spraying of the liquid when the output signal generated by the sensor indicates that said sensor is being subjected to a stress having a second predetermined value;
   iv) terminating the spraying of the liquid and resuming the dispersion of the guest powder so that said guest powder continues to coat said core particles when the output signal indicates that said sensor is being subjected to a stress having a third predetermined value which is greater than said second predetermined value; and
   v) repeating steps iii) and iv) alternately until the guest powder is dispersed up to a predetermined amount.

5. A method for powder coating granulation comprising the steps of:
   (i providing a liquid onto core particles contained in a granulating chamber and producing a predetermined flow of said particles on a continuously rotating rotor in the granulating chamber;
   ii) providing a guest powder, concurrently with the providing a guest powder, concurrently with the provision of the liquid to the chamber when an output signal produced by a sensor disposed in said granulating chamber indicates that said sensor is being subjected to a stress produced by said predetermined flow and having a first predetermined value;
   iii) changing an amount of at least one of the guest powder and the liquid provided to said chamber when the output signal, which is generated by the sensor changes from said first initial predetermined value by a predetermined amount; and
   iv) repeating step iii) until the guest powder is dispersed up to a predetermined amount.

6. A centrifugal fluidizing granulator comprising:

a granulating chamber into which core particles are provided;

power supply means for providing a guest powder to said granulating chamber;

liquid supply means for providing a liquid to said granulating chamber;

a rotor disposed within said granulating chamber for mixing said core particles with said guest powder and said liquid so that said core particles are coated with said guest powder to form guest powder coated core particles;

a sensor cooperable with said granulating chamber for detecting a surface condition of said guest powder coated core particles, said surface condition being controlled by selective addition of said guest powder by said power supply means and of said liquid by said liquid supply means to said granulating chamber, the selective addition of said guest powder and said liquid effecting an increase in an amount of said guest powder coated on said guest powder coated core particles; and control means responsive to said sensor for controlling said power supply means to provide said guest powder to said granulating chamber when said sensor detects that said guest powder coated core particles are in a first predetermined condition and for controlling said liquid supply means to provide said liquid to said granulating chamber when said sensor detects that said guest powder coated core particles are in a second predetermined condition, said control means thereby being operable to selectively add said liquid and said guest powder to said granulating chamber until said guest coated core particles are coated with a predetermined amount of said guest powder.

7. A centrifugal fluidizing granulator according to claim 6, wherein said rotor moves said guest power coated core particles in a predetermined macroscopic path; and said sensor has an incident member disposed at a predetermined position within said predetermined path and an outer surface for being impacted by said guest powder coated core particles, said outer surface having a major portion thereof facing a direction inclined with respect to said predetermined path at said predetermined position so that when said guest powder particles impact said outer surface, friction therebetween enables said sensor to detect said surface condition of said guest powder coated core particles.

8. A centrifugal fluidizing granulator according to claim 7, wherein:

said incident member comprises a substantially flat plate and said outer surface comprises first and second sides of said flat plate, said sides facing a direction generally orthagonal to said predetermined path at said predetermined position.

9. A centrifugal fluidizing granulator according to claim 8, wherein:

said flat plate has two side edges, one of which generally faces a direction in which said guest powder coated particles approach said flat plate as they are moved in said predetermined path.

10. A centrifugal fluidizing granulator according to claim 7, wherein:

said incident member comprises a generally cylindrical shape.

11. A centrifugal fluidizing granulator comprising:

a granulating chamber into which core particles, a guest powder, and a liquid are provided;

a rotor disposed within said granulating chamber for mixing said core particles, said guest powder and said liquid to form guest powder coated core particles which are moveable in a predetermined macroscopic path;

a sensor cooperable with said granulating chamber for detecting a surface condition of said guest powder coated core particles, said sensor having an incident member disposed at a predetermined position within said predetermined path and an outer surface for being impacted by said guest powder coated core particles, said outer surface having a major portion thereof facing a direction inclined with respect to said predetermined path at said predetermined position so that when said guest powder coated are particles impact said outer surface, friction therebetween enables said sensor to detect said surface condition of said guest powder coated core particles; and control means responsive to said sensor for controlling an amount of liquid and guest powder provided to said granulating chamber according to said surface condition of said guest power coated core particles.

12. A centrifugal fluidizing granulator according to claim 11, wherein:

said incident member comprises a substantially flat plate and said outer surface comprises first and second sides of said flat plate, said sides facing a direction generally orthagonal to said predetermined path at said predetermined position.

13. A centrifugal fluidizing granulator according to claim 12, wherein:

said flat plate has two side edges, one of which generally faces a direction in which said guest powder coated particles approach said flat plate as they are moved in said predetermined path.

14. A centrifugal fluidizing granulator according to claim 11, wherein:

said incident member comprises a generally cylindrical shape.

15. A method for powder coating granulation comprising the steps of:

providing a predetermined amount of guest powder and liquid to core particles to form guest powder coated core particles within a granulation chamber;

detecting a viscosity of said guest powder coated core particles;

providing said granulation chamber with additional amounts of said liquid and said guest powder alternately according to the viscosity of said guest powder coated core particles to thereby increase the size of said of said guest powder coated core particles.

16. A method for powder coating granulation, comprising the steps of:

providing a liquid and a guest powder in specified amounts to a granulating chamber containing core particles so as to coat said core particles with said guest powder and form guest powder coated core particles;

determining a viscosity of said guest powder coated core particles; and controlling said specified amounts of liquid and guest powder provided to said granulating chamber according to the viscosity of said guest powder coated core particles until a predetermined amount of said guest powder is provided to said granulation chamber.

* * * * *